United States Patent Office 3,488,424
Patented Jan. 6, 1970

1

3,488,424
DERIVATIVES OF THIACHROMANE AS DIURETICS
Jacques Robert Boissier, Paris, and Charles Edouard Malen, Fresnes, France, assignors to Societe Industrielle pour la Fabrication des Antibiotiques (S.I.F.A), Paris, France, a French company
No Drawing. Original application May 13, 1964, Ser. No. 367,202, now Patent No. 3,355,459, dated Nov. 28, 1967. Divided and this application Oct. 11, 1967, Ser. No. 698,998
Claims priority, application France, May 24, 1963, 935,905
Int. Cl. A61k 27/00
U.S. Cl. 424—275     3 Claims

ABSTRACT OF THE DISCLOSURE

This invention relates to diuretic compositions containing derivatives of thiachromanes.

---

This is a division of application Serial No. 367,202, filed May 13, 1964, now U.S. Patent No. 3,355,459.

This invention relates to new derivatives of thiachromanes which can be used as therapeutic substances or for the preparation of such substances, and also to a process for the preparation of these new derivatives.

The new derivatives provided by the invention are compounds of the general formula:

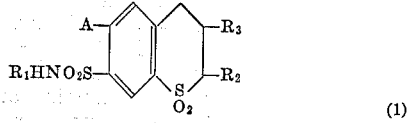

in which A represents a halogen atom or an alkyl radical of low molecular weight, and $R_1$, $R_2$ and $R_3$, which may be the same or different, each represent a hydrogen atom or an alkyl radical of low molecular weight.

These new derivatives of Formula 1 can be prepared by treating a substituted thiachromane of the general formula:

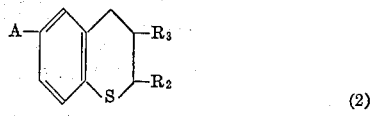

(in which A, $R_2$ and $R_3$ have the meanings defined above) with an oxidation agent, in order to obtain a substituted thiachromane - 1,1 - dioxide, treating this dioxide with chlorosulphonic acid, and thereafter reacting the intermediate formed with a substance of the general formula $NH_2R_1$ ($R_1$ having the meaning indicated above) and subsequently separating the derivative of the general Formula 1 obtained.

In carrying out the process according to the invention, the stages which have just been mentioned can be represented by the the following diagrams:

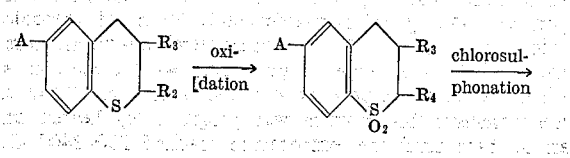

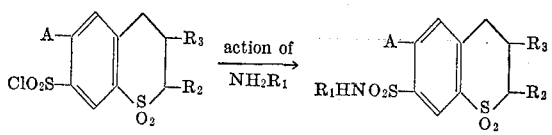

These stages are advantageously carried out under the following conditions:

The oxidation is effected with the aid of hydrogen peroxide, preferably titrating about 110 volumes, while heating and in the presence of acetic acid.

The chlorosulphonation with the chlorosulphonic acid is effected between 60° and 150° C., and preferably between 60° and 90° C., while on completion of the reaction, the excess of this reactant is eliminated by hydrolysis with the aid of crushed ice.

When $R_1$ is not a hydrogen atom, the action of $NH_2R_1$ is effected in a common solvent for the two compounds, which are left in contact with each other for a few hours before eliminating the solvent; when $R_1$ is a hydrogen atom, it is expedient to employ liquid ammonia.

The separation is carried out by taking up the residue in water and by precipitating the desired derivative by slight acidification of the medium.

Thus, it is possible for example to dissolve a compound of the general Formula 2, in acetic acid, then to add a large excess of 110 volume hydrogen peroxide, to place the mixture for 30 minutes on a boiling water bath and to pour the solution into cold water. The precipitate which is obtained is centrifuged, washed, dried, then an excess of chlorosulphonic acid is added and the mixture is placed on a water bath for about 2 hours. The solution is then poured onto crushed ice and the precipitate formed is centrifuged, washed with water and dried. The sulphochloride thus obtained is then added either to an excess of liquid ammonia or to an excess of aqueous amine solution $NH_2R_1$. After standing for some time, the excess of reagent is evaporated and the desired compound of Formula 1 is precipitated by slightly acidifying the medium with hydrochloric acid; it is then centrifuged, washed with water and dried.

The starting materials of the process according to the invention are the substituted thiachromanes of general Formula 2.

These compounds can be obtained for example by the processes described in Berichte (1923), 56, 1819–1824 or Berichte (1925), 58, 1654–1676 by condensing a thiophenol, substituted in the para-position by a halogen atom or an alkyl radical, with a substituted acrylic acid of the general formula

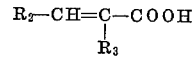

or its methyl ester, cyclising the derivative which is obtained so as to provide a substituted thiachromanone and reducing this latter compound to a thiochromane of the Formula 2 by the Clemmensen process (Org. Resc. Vol. 1) or by the Wolff-Kishner process (Org. Resc. Vol 4).

The investigation of the toxicological and pharmacological properties of the new derivatives provided by the invention has shown that these new derivatives have a low toxicity ($LD_{50}$ perorally, generally greater than 2 g./kg. in a mouse) and have interesting diuretic properties. These properties have been proved by giving to rats orally the derivative under consideration in doses of 5 mg./kg., 10 mg./kg., 50 mg./kg. and sometimes 200 mg./kg. The results have been set out in the following table, which gives, for each of the derivatives investigated, the diuresis obtained as a function of the administered doses and the comparison with the diuresis of control animals.

TABLE

| Tested derivatives of Formula (1), the substituents A, $R_1$, $R_2$ and $R_3$ having the following meaning | | | | Dose, mg./kg. per os | Diuretic activity diuresis ml./rat/6 hours | | |
|---|---|---|---|---|---|---|---|
| A | $R_1$ | $R_2$ | $R_3$ | | Control animals | Treated animals | $\frac{\text{Treated diur.}}{\text{Control diur.}} \times 100$ |
| Cl | H | H | H | 5 | 0.36 | 0.86 | 240 |
|  |  |  |  | 10 | 0.36 | 1.66 | 460 |
|  |  |  |  | 50 | 0.75 | 5.86 | 780 |
|  |  |  |  | 200 | 0.75 | 7.45 | 990 |
| $CH_3$ | H | H | H | 5 | 0.36 | 0.55 | 150 |
|  |  |  |  | 10 | 0.36 | 1.53 | 430 |
|  |  |  |  | 50 | 0.40 | 2.16 | 540 |
|  |  |  |  | 200 | 0.40 | 3.91 | 980 |
| $CH_3$ | H | $CH_3$ | H | 5 | 0.51 | 0.95 | 190 |
|  |  |  |  | 10 | 0.51 | 1.43 | 280 |
|  |  |  |  | 50 | 0.85 | 2.55 | 300 |
| $CH_3$ | H | H | $CH_3$ | 5 | 0.80 | 1.30 | 160 |
|  |  |  |  | 10 | 0.80 | 2.45 | 310 |
|  |  |  |  | 50 | 0.85 | 2.95 | 350 |
| $CH_3$ | $CH_3$ | H | H | 5 | 0.76 | 0.76 | 100 |
|  |  |  |  | 10 | 0.76 | 0.85 | 110 |
|  |  |  |  | 50 | 0.82 | 0.96 | 120 |
| $CH_3$ | $CH_3$ | $CH_3$ | H | 5 | 0.40 | 0.35 | 90 |
|  |  |  |  | 10 | 0.40 | 0.45 | 110 |
|  |  |  |  | 50 | 0.82 | 0.72 | 90 |
| Cl | H | $CH_3$ | H | 5 | 0.96 | 2.20 | 230 |
|  |  |  |  | 10 | 0.96 | 4.36 | 450 |
|  |  |  |  | 50 | 0.38 | 1.95 | 510 |
| $CH_3$ | H | $C_2H_5$ | H | 5 | 0.48 | 0.66 | 140 |
|  |  |  |  | 10 | 0.48 | 0.91 | 190 |
|  |  |  |  | 50 | 0.38 | 0.75 | 200 |

One of the new derivatives, namely, 6-methyl-7-sulphamidothiachromane - 1,1 - dioxide, has been more particularly investigated. This product was administered perorally to mice in a dose of 2 g./kg., and no death occurred.

In addition, its diuretic activity has been proved in connection with a dog. After intravenous injection of 50 mg./kg. of the derivative and taking samples of the urine by urethral catheterism, it was possible to confirm, in connection with the anaesthesised animal, that the diuresis was six times higher than the normal diuresis one hour after injection and was still twice as strong three hours afterwards. In connection with the awakened dog re-receiving perorally 50 mg./kg. of the derivative, it was found, after taking samples of the urine by a vesicle catheter, that the diuresis was tripled during the first three hours following the ingestion, and was still doubled with respect to the normal diuresis five hours afterwards.

In addition, it was established that the products have a low carbonic antianhydrase activity, this permitting a more convenient therapeutic utilisation.

These properties make the products according to the invention substances which are useful in human therapeutics, for example in the treatment of oedemas, cardiorenal disturbances and obesity.

The present invention also provides pharmaceutical compositions which comprise, as active principles, one or more of the derivatives corresponding to the general Formula 1. These compositions are obtained in such a manner as to be capable of being administered by the digestive or parenteral tracts; they may be solid or liquid and exist in the pharmaceutical forms at present used in human medicine; the active principle or principles are associated with various excipients normally employed in these pharmaceutical compositions, for example talcum, gum arabic, lactose, starch, magnesium stearate, cocoa butter, aqueous or non-aqueous vehicles, oils, and the various wetting, dispersing and emulsifying agents.

The active therapeutic dose varies according to the subjects, the seriousness of the cases and the effect which is desired. Generally speaking, the useful dosology perorally in connection with a human being is between 0.10 g. and 1 g. per day.

The follow examples illustrate the invention:

EXAMPLE 1

Preparation of 2,6-dimethyl-7-sulphamido-thiachromane-1,1-dioxide 34 g. of 2,6-dimethylthiachromane were dissolved in 360 cc. of acetic acid and 180 cc. of 110-volume hydrogen peroxide were added. The solution was placed for 30 minutes on a boiling water bath and the solution was poured into 1000 cc. of cold water. The precipitate formed was centrifuged, washed and dried and there were obtained 30 g. of 2,6-dimethylthiachromane-1,1-dioxide. (Yield, 75%; melting point on a Kofler bench: 113–114° C.; empirical formula: $C_{11}H_{14}O_2S$; proportion of sulphur; theoretical, 15.23%; found, 15.36%.)

17 g. of the thus-obtained 2,6-dimethylthiachromane-1,1-dioxide were then added to 70 cc. of chloro-sulphonic acid. The mixture was placed for 2 hours on a water bath at 70–90° C. and then this solution was poured onto crushed ice; a white precipitate was formed, which was washed and dried. There were obtained 20 g. of 2,6-dimethyl-7-chlorosulphonyl thiachromane-1,1 - dioxide. (Yield, 77%; melting point: 160° C.; empirical formula: $C_{11}H_{13}ClO_4S_2$; proportion of sulphur: theoretical, 20.80%; found, 20.89%.)

Finally, 15 g. of this product were added to 100 cc. of liquid ammonia and left until the ammonia had evaporated. The residue was taken up in water. The precipitate which formed was acidified, centrifuged and washed with water. There were obtained 7 g. of 2,6-dimethyl-7-sulphamidothiachromane-1,1-dioxide, on crystallisation from water. (Melting point: 224–225° C.).

Empirical formula: $C_{11}H_{15}NO_4S_2$.

Proportion of sulphur; Theoretical, 22.54%; found, 22.46%.

The initial 2,6-dimethylthiachromane could be obtained for example in the following manner: there was first of all prepared the β-(paratolyl-thio) butyric acid; for this purpose, 44.6 g. of para-thiocresol, 36 g. of crotonic acid, 6 drops of a 40% solution of tetrabutyl ammonium hydroxide and 6 drops of piperidine were placed in a spherical flask equipped with a reflux condenser and a thermometer; this mixture was progressively heated on an oil bath until the temperature reached 230–240° C.

The flask was allowed to cool and the mixture was taken up in water and extracted by means of benzene. The benzenic layers were washed with water, the benzene was evaporated and the residue was distilled with a vane pump. There were obtained 54.7 g. of β-(paratolyl-thio) butyric acid (B.P. 0.02: 120–124° C.).

50. g. of this acid were then treated with 500 g. of sulphuric acid (66° Bé.); the mixture was left to stand for several hours and was then heated for 1 hour to 50 to 60° C. The red liquid which was obtained was poured onto 2 kg. of crushed ice and the thiachromanone formed was extracted by means of chloroform. The chloroformic solution was washed and dried and then distilled. There were obtained 36.7 g. of 2,6-dimethyl-4-thiachromanone (M.P.: 64–65° C.).

This product was then reduced, either by a Clemmensen reaction in the presence of zinc and hydrochloric acid, or by a Wolff-Kishner reaction in the presence of hydrazine. Starting from 36 g. of 2,6-dimethyl-4-thiachromanone, 17.8 g. (yield: 53.5%) of 2,6-dimethylthiachromane were obtained by Clemmensen reduction and 24.9 g. (yield: 75%) of 2,6-dimethylthiachromane (melting point: 28–32° C.) by Wolff-Kishner reduction.

EXAMPLE 2

Preparation of 6-methyl-7-sulphamido-thiachromane-1,1-dioxide 64.5 g. of 6-methylthiachromane were dissolved in 500 cc. of acetic acid and 250 cc. of 110-volume hydrogen peroxide were added. The solution was placed on a water bath for ½ hour; it was then diluted with iced water, the precipitate obtained was recovered, and this was washed and dried. There were obtained 59.6 g. of 6-methylthiachromane-1,1-dioxide (yield: 77.5%—melting point 79–81° C.).

52 g. of this product were added to 250 cc. of chlorosulphonic acid and the mixture was placed on a water bath at a temperature of 70–75° C. for 2 hours. It was allowed to cool and poured onto crushed ice; the product was extracted by means of chloroform, the extracted solutions were washed and the chloroform was evaporated. There were obtained 67 g. of crude 6-methyl-7-chloro-sulphonyl - thiachromane - 1,1 - dioxide (yield: 86%—melting point on a heating stage microscope 158–161° C.).

47 g. of this sulphochloride were introduced into 200 cc. of liquid ammonia. The mixture was left to stand at ambient temperature until the ammonia evaporated. The residue was taken up in water and the solution was acidified. The precipitate formed was centrifuged, washed with water and dried. There were obtained 30.8 g. of 6-methyl-7-sulphamido-thiachromane - 1,1 - dioxide, recrystallised from 2-methoxy ethanol (yield: 49%; melting point on heating stage microscope: 236–237° C.).

Empirical formula: $C_{10}H_{13}NO_4S_2$.

Proportion of sulphur: Theoretical, 23.27%; found, 22.77%. Proportion of nitrogen: theoretical, 5.08%; found, 5.28%.

EXAMPLE 3

Preparation of 3,6-dimethyl-7-sulphamido-thiachromane-1,1-dioxide 8.8 g. of 3,6-dimethylthiachromane were dissolved in 50 cc. of 110-volume hydrogen peroxide to which 100 cc. of acetic acid were added. This was placed on a water bath for 30 minutes. There were obtained 9 g. of 3,6-dimethylthiachromane-1,1-dioxide. (Melting point 102° C. on a heating stage microscope after recrystallisation from ethyl alcohol 95. Proportion of sulfur: theoretical, 15.01%; found, 14.80%.)

6.7 g. of the derivative obtained were added to 50 cc. of chlorosulphonic acid and the mixture was heated on a water bath for 1½ hours to 70° C. After precipitation on crushed ice, extraction with chloroform and evaporation of the solvent, there were obtained 7.4 g. of 3,6- dimethyl - 7 - chlorosulphonyl-thiachromane-1,1-dioxide which was crystallised from benzene. (Yield: 75%— melting point on heating stage microscope: 157–158° C.—proportion of chlorine: theoretical, 11.49%; found, 11.53%.)

7 g. of this sulphochloride were introduced into 50 cc. of liquid ammonia. After spontaneous evaporation of the ammonia, the substance was taken up in water, acidified and dried. There were obtained 5 g. of 3,6-dimethyl-7-sulphamido-thiachromane-1,1-dioxide, which was crystallised from water (melting point on heating stage microscope: 173–175° C.).

Empirical formula: $C_{11}H_{15}NO_4S_2$.

Proportion of sulphur: theoretical, 22.16%; found, 22.10%.

The following derivatives were also prepared in accordance with the process described in the above examples:

(a) 6 - chloro-7-sulphamido-thiachromane-1,1-dioxide, crystallised from 2-methoxy ethanol (melting point: 216–218° C.—empirical formula: $C_9H_{10}NO_4S_2Cl$).

(b) 2 - methyl-6-chloro-7-sulphamido - thiachromane-1,1-dioxide, crystallised from 96% ethanol (melting point: 202–204° C.—empirical formula: $C_{10}H_{12}NO_4S_2Cl$ —proportion of sulfur: theoretical, 20.67%; found, 20.57%—proportion of chlorine: theoretical, 11.47%; found, 11.57%).

(c) 2 - ethyl-6-methyl-7-sulphamido - thiachromane-1,1-dioxide, crystallised from isopropanol (melting point: 224–225° C.—empirical formula $C_{12}H_{17}NO_4S_2$—proportion of sulfur: theoretical, 21.14%; found, 20.93%).

EXAMPLE 4

Preparation of 6-methyl-7-methylsulphamido-thiachromane-1,1-dioxide 19.4 g. of 6-methyl-7-chlorosulphonyl-thiachromane-1,1-dioxide, prepared according to Example 2, were introduced into 150 cc. of a 33% aqueous solution of monomethylamine. They were left in contact for several hours and the solution was partially evaporated: the precipitate which formed was acidified and centrifuged, and then it was washed and dried. There were obtained 13.3 g. of 6 - methyl - 7 - methyl-sulphamido-thiachromane-1,1-dioxide which was crystallised from 95% ethanol. (Yield: 70%—melting point on Kofler bench: 194–195° C.)

Empirical formula: $C_{11}H_{15}NO_4S_2$.

Proportion of sulphur: theoretical, 22.16%; found, 22.50%.

In accordance with this process, there was also prepared 2,6-dimethyl - 7 - methylsulphamido-thiachromane-1,1-dioxide, which was crystallised from 95% ethanol. (Melting point: 204° C.—empirical formula:

$C_{12}M_{17}NO_4S_2$.)

EXAMPLE 5

Tablets were prepared which conformed to the following composition:

|   | G. |
|---|---|
| 6-methyl-7-sulphamido-thiachromane-1,1-dioxide | 0.200 |
| lactose, talcum, wheat starch, magnesium stearate, icing sugar, quantity to make 1 completed tablet | 0.500 |

We claim:
1. A diuretic pharmaceutical composition comprising an effective amount of a compound of the general formula

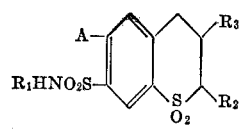

in which A represents a member selected from the group consisting of halogen atoms and lower alkyl and $R_1$, $R_2$ and $R_3$ each represent a member selected from the group consisting of hydrogen atoms and lower alkyl and a pharmaceutical excipient.

2. A diuretic pharmaceutical composition comprising an effective amount of 6-methyl-7-sulphamido-thiachromane-1,1-dioxide and a pharmaceutical excipient.

3. A diuretic pharmaceutical composition comprising about 0.2 gram of 6-methyl-7-sulphamido-thiachromane-1,1-dioxide and a pharmaceutical excipient.

References Cited

UNITED STATES PATENTS

| | | | |
|---|---|---|---|
| 3,112,307 | 11/1963 | Goldberg et al. | 260—243 |
| 3,113,918 | 5/1964 | MacPhillamy et al. | 260—243 |

ALBERT T. MEYERS, Primary Examiner

J. D. GOLDBERG, Assistant Examiner